United States Patent [19]
Fujioka et al.

[11] Patent Number: 4,933,549
[45] Date of Patent: Jun. 12, 1990

[54] LIGHT BEAM SCANNING APPARATUS

[75] Inventors: Takanobu Fujioka, Chofu; Takashi Mama, Kawasaka; Yoshio Kaneko; Kenichirou Asada, both of Tokyo, all of Japan

[73] Assignee: Ricoh Company, Ltd., Tokyo, Japan

[21] Appl. No.: 281,207

[22] Filed: Dec. 8, 1988

[30] Foreign Application Priority Data

Dec. 11, 1987 [JP] Japan .............. 62-189341[U]

[51] Int. Cl.$^5$ .............................. H01J 3/14
[52] U.S. Cl. ........................... 250/235; 358/481
[58] Field of Search ........... 250/234, 235, 236, 237 G; 358/481, 494; 346/108

[56] References Cited

U.S. PATENT DOCUMENTS 4,423,426 12/1983 Kitamura ........................ 358/481
4,667,099 5/1987 Arai et al. ...................... 250/235

Primary Examiner—David C. Nelms
Attorney, Agent, or Firm—Oblon, Spivak, McClelland, Maier & Neustadt

[57] ABSTRACT

A multi-beam detecting apparatus adapted to an optical system in which a recording medium is scanned by a plurality of light beams emitted from respective light sources, includes a photodetector, a light interrupting member, and a control circuit. The photodetector produces detection signals when the corresponding light beams come to a predetermined position. The light interrupting member is interposed between the light sources and the light detecting member, and has transparent portions related to the respective light beams. A controlling circuit controls ON/OFF states of the light source in accordance with the respective detection signals related to the corresponding light beams passing through the respective transparent portions in the light interrupting member.

11 Claims, 8 Drawing Sheets

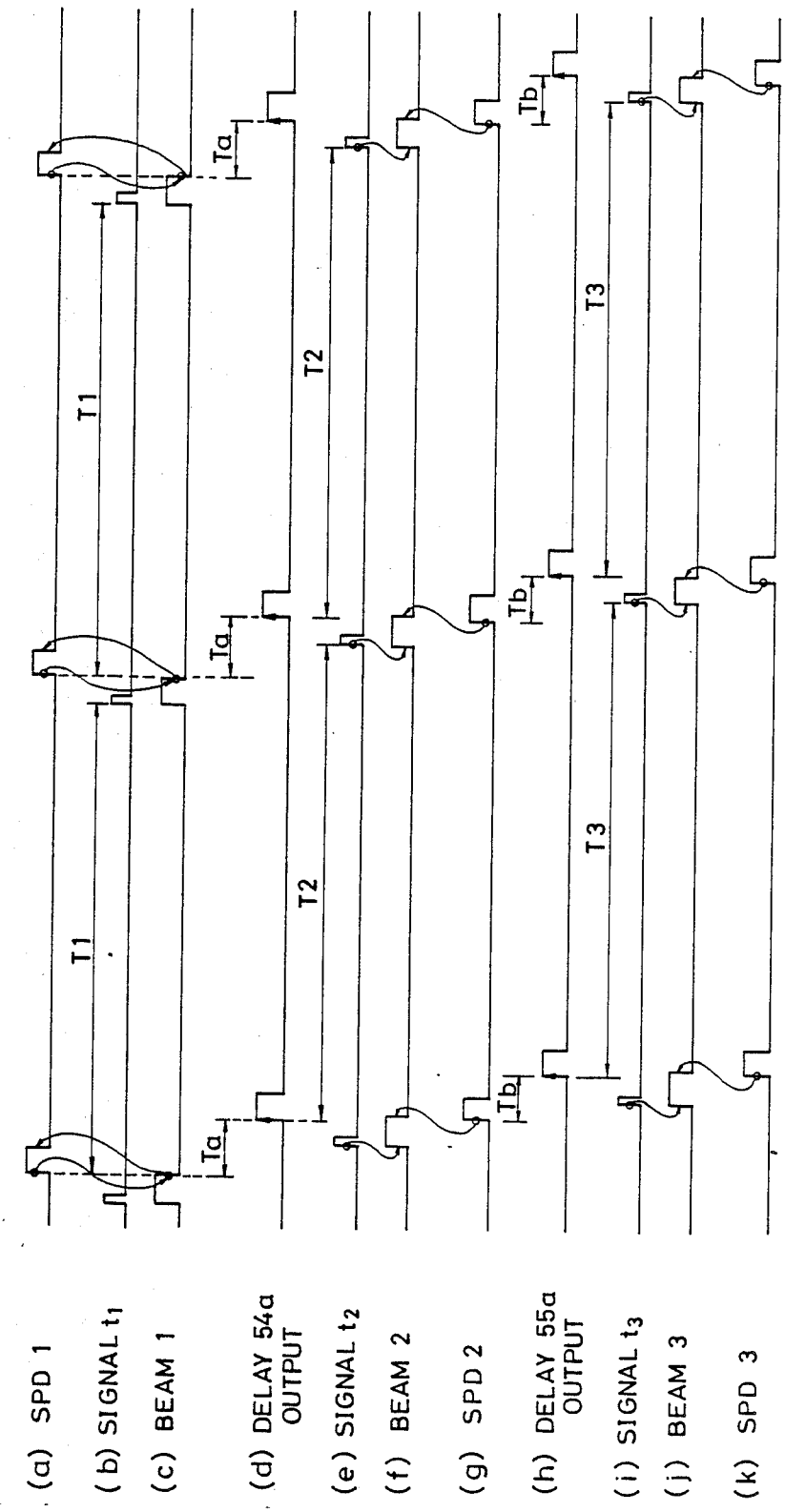

LIGHT BEAM SCANNING APPARATUS

BACKGROUND OF THE INVENTION

The present invention generally relates to a light beam scanning apparatus, and in particular to a light beam scanning apparatus in which a recording medium is scanned by using a plurality of light beams emitted simultaneously. The present invention relates, more particularly, to a multi-beam detecting apparatus built in the light beam scanning apparatus for separately detecting a plurality of light beams by using a single photodetector. Such a multi-beam detecting apparatus is applicable to a light beam scanning apparatus such as printers, copiers and facsimile machines in order to control modulation start timing for the light beam.

Recently, optical systems such as printers, copiers and facsimile machines which utilize a laser beam has come into wide use. A laser beam is used for writing information on a recording medium such as a photosensitive drum. The use of a laser beam makes it possible to increase the scanning speed and enhance the resolution of printed images. In such systems, it is required to deflect a laser beam in order to scan the recording medium. In conventional printers and copiers, polygon scanners or polygon mirrors are widely used as light deflectors, and contributes to increasing the scanning speed. However, there is a limited rotational speed of such optical deflectors in view of mechanical structures thereof. Therefore, currently, there is considerable activity in the development of multi-beam scanning systems in which a plurality of light beams are simultaneously deflected and is then irradiated on a recording medium. With such multi-beam scanning systems, it becomes possible to increase the scanning speed without increasing the rotational speed of optical deflectors.

FIG. 1 shows an example of a conventional optical beam scanning apparatus. The illustrated scanning apparatus comprises the following structural parts. A light source array 1 is constituted by a laser diode array capable of emitting a plurality of laser beams at the same time (three beams in the illustrated example). A collimator lens 2 forms the laser beams emitted from the light source unit 1 to parallel laser beams. An optical deflector 3 is constituted by a polygon mirror. The polygon mirror 3 rotates in the direction indicated by an arrow A3, and deflects the parallel laser beams from the collimator lens 2 in a main scanning direction indicated by an arrow A1. Thereby, the deflected parallel laser beams, or scanning beams repetitively scan a recording medium 7 of a photosensitive drum in the main scanning direction of the arrow A1. An image formation lens 4 focuses each of the scanning beams so as to have predetermined diameters and be arranged, with a predetermined pitch, on a circumferential surface of the photosensitive drum 7. A reflection mirror 5 is provided for guiding the scanning beams from the polygon mirror 3 toward a photodetector 6. The photodetector 6 receives the scanning beams reflected on the reflection mirror 5.

In the optical beam scanning apparatus thus constructed, the photosensitive drum 7 is raster-scanned. That is, the photosensitive drum 7 is repetitively scanned in the main scanning direction of the arrow A1 by the deflected laser beams, while driven in a sub scanning direction indicated by the direction of an arrow A2. In a case where the photosensitive drum 7 is substituted with a plate-shaped recording medium, it is driven linearly.

With the above-mentioned structure, it becomes possible to write information on the corresponding plurality of lines at one time. As a result, it becomes possible to increase the speed of the sub scan multiple times corresponding to the number of the plurality of scanning beams. Further, it is unnecessary to alter a pixel clock used for modulating laser beams.

The photodetector 6 is served as a synchronization detecting means, which detects an event that the laser beams come to a predetermined position, and simultaneously starts a modulation control for the laser beams. By using the photodetector 6, it becomes possible to establish a synchronization for the laser beams, even if there are fluctuations in deflection arising from states of planes of the polygon mirror 3. In other words, modulation (writing) starting times (positions) for the respective laser beams can be compensated.

In order to establish the above-mentioned synchronization, it is required to separately detect the scanning beams with high accuracy. In multi-beam systems, it is required to set a distance between loci of scanning beams equal to a pitch for a desired write density. It is further required that the scanning beams are detected in the vicinity of the peripheral surface of the photosensitive drum 7. In order to meet the above-mentioned requirements, it is known to arrange independent photodetectors as many as the number of laser beams. However, this is not suitable for practical use, because it is necessary for the photodetectors to be actually arranged with a designed write pitch.

In order to overcome the above-mentioned problem, it is also known to emit a plurality of laser beams so as to be arranged into a line in the sub scanning direction. However, there is a limitation on the beam emission pitch of the laser diode unit 1. Currently, it is very difficult to emit a plurality of laser beams with a beam emission pitch corresponding to a high write density equal to or greater than 300 dots per inch. For this reason, actually, a laser diode array is constructed by a plurality of laser diodes arranged with a pitch greater than a desired beam emission pitch, and is positioned so as to be inclined at a predetermined angle with respect to the sub scanning direction. With the above laser diode array, it becomes possible to obtain on the circumferential surface of the photosensitive drum 7, a pitch between adjacent beams corresponding to the desired write density.

It is noted that in the above-mentioned case, the laser beams do not arrive at the photodetector 6 at the same time, or in other words, there is a differences in the incoming time between the laser beams. For this reason, it is necessary to control a modulation (writing) starting time (position) for each of the laser beams. For this purpose, it is particularly desired to separately detect laser beams with high accuracy.

For example, the Japanese Laid-Open Patent Application No. 57-67375 proposes the use of a light interrupting plate, or slit plate, which is interposed between the light source unit 1 and the photodetector 6. The proposed slit plate has a single slit extending in the sub scanning direction. The slit plate functions to separately detect the incoming of the plurality of scanning laser beams.

FIG. 2 is a view for explaining the principle of the conventional detection scheme by use of the slit plate. As shown, spots of four laser beams B1–B4 are arranged into a line so as to be inclined at an angle $\theta$ with respect to a line Y—Y perpendicular to the main scanning direction A1. A slit plate having a slit S of a width Ds is placed in the front of the photodetector 6. The synchronization necessary for modulating the light beams is established by detecting light beams which pass through the slit S.

However, the prior art disclosed in the publication has disadvantages described below. It is impossible to make the width Ds of the slit S larger than a beam interval Da, which is determined depending on the pitch of the arrangement of the laser diodes and diameters of spots of the laser beams B1 to B4. Therefore, there is a limited quantity of light which can be received by the photodetector 6. Particularly, as the laser beams scan the photosensitive drum 7 faster, the photodetector 6 receives a decreased amount of light. This deteriorates the detection of light.

In order to eliminate the above problem, it is conceivable to increase a distance Da between opposite edges of adjacent spots of laser beams to thereby increase a distance Db between the centers of the adjacent beams. However, the above causes some problems in view of design of an optical system. For example, it is necessary to increase areas of deflection surfaces of the polygon mirror 6.

It is preferable that the oblique angle $\theta$ of the laser diode array built in the laser diode unit 1 is made as small as possible in cases when giving the priority to the design of optical systems in order to obtain a simple structure thereof while taking into consideration costs and performance. Therefore, an improved multi-beam detecting apparatus is desired capable of separately detecting a plurality of scanning beams which are arranged with a very small value of the distance Da.

SUMMARY OF THE INVENTION

It is therefore a general object of the present invention to provide a novel and useful mutli-beam detecting apparatus in which the aforementioned problems are eliminated.

A more specific object of the present invention is to provide a multi-beam detecting apparatus capable of separately detecting, with high accuracy, a plurality of light beams which come to a single photodetector at slightly different times.

Another object of the present invention is to provide a multi-beam detecting apparatus suitable for controlling the start of the modulation for the respective light beams.

The above objects of the present invention can be achieved by a multi-beam detecting apparatus adapted to an optical system in which a recording medium is scanned by a plurality of light beams emitted from respective light sources, includes a photodetector, a light interrupting member, and a controlling circuit. The photodetector produces detection signals when the corresponding light beams come to a predetermined position. The light interrupting member is interposed between the light sources and the light detecting member, and has transparent portions related to the respective light beams. A controlling circuit controls ON/OFF states of the light source in accordance with the respective detection signals related to the corresponding light beams passing through the respective transparent portions in the light interrupting member.

Other objects, features and advantages of the present invention will become apparent from the following detailed description when read in conjunction with the accompanying drawings.

BRIEF DESCRIPTION OF THE DRAWINGS

FIG. 10 is a timing chart showing waveforms of signals observed at parts of the structure of FIGS. 8 and 9.

DETAILED DESCRIPTION

Figure 1:
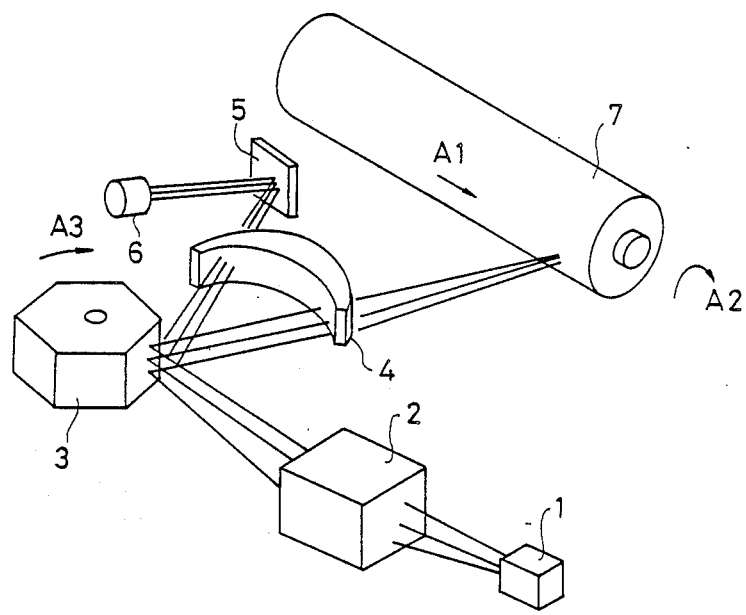
FIG. 1 is a perspective view of a conventional light beam scanning apparatus in which a light beam detecting apparatus is used.
Figure 2:
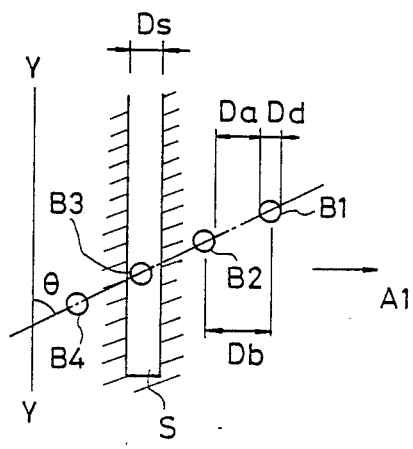
FIG. 2 is a view of a conventional light beam detecting apparatus.
Figure 3:
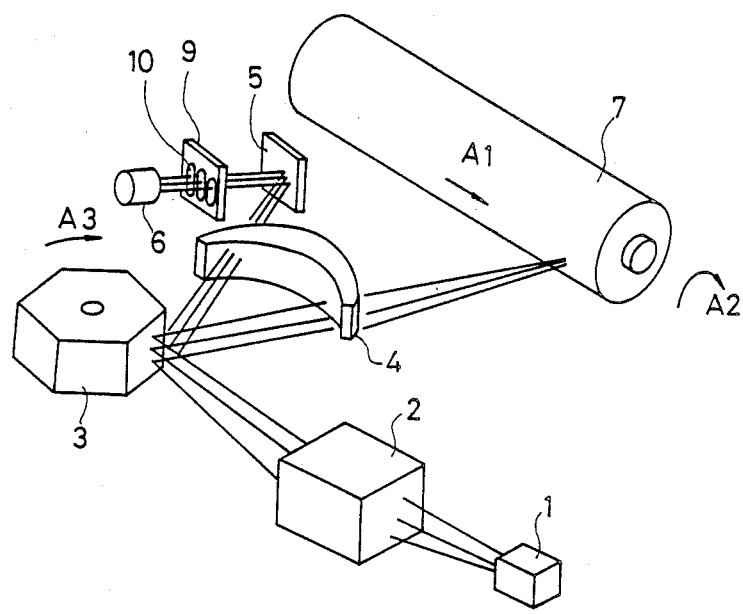
FIG. 3 is a schematic perspective view of a light beam scanning apparatus in which an embodiment of the present invention is employed.

A description is given of a preferred embodiment of the present invention with respect to FIG. 3. In FIG. 3. those parts which are the same as those in FIG. 1 are indicated by the same reference numerals. A slit plate 9 is interposed between the reflection mirror 5 and the photodetector 6. The slit plate 9 has a plurality of slits 10 as many as a plurality of scanning beams. In the illustrated embodiment, three slits 10 are provided in the slit plate 9. The slits 10 are arranged in parallel with each other along the sub scanning direction perpendicular to the main scanning direction A1. The slit plate 9 is located in the vicinity of the peripheral surface of the photosensitive drum 7 and close to the photodetector 6. As is described below, the slit plate 9 is clearly distinct from the aforementioned conventional slit plate shown in FIG. 2.

An essential feature of the present invention is that in order to separately detect the scanning beams reflected on the reflection mirror 5, the laser diodes in the laser diode unit 1 are turned ON/OFF by the cooperation of the slit plate 9 and a synchronization control circuit described in detail later.

Figure 4A:
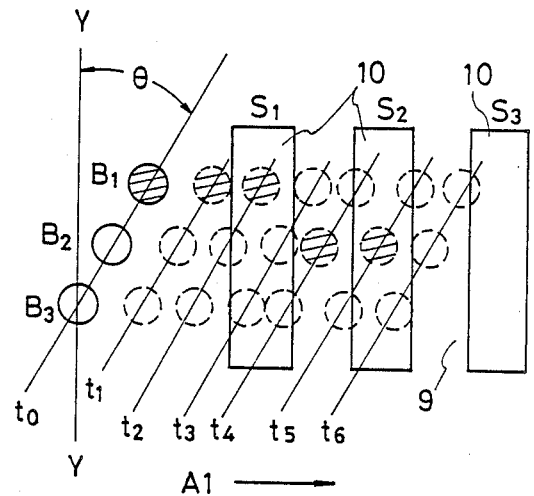
FIGS. 4A and 4B are views for explaining the principle of the present invention.
Figure 4B:
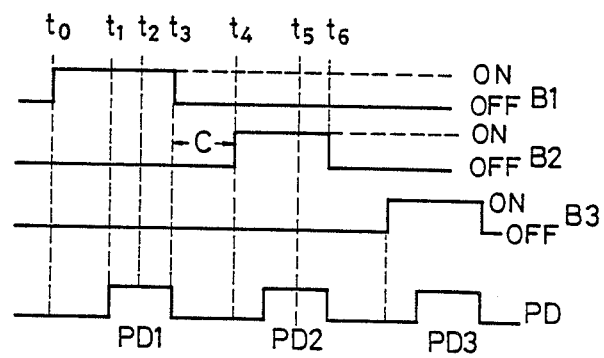

FIG. 4A is a view showing the movement of laser beams on the slit plate 9 with the passage of time, and FIG. 4B is a timing chart showing operations of the photodetector 6 and laser diodes. In the illustrated example, three laser beams form spots on the slit plate 9, as shown by circles indicated by B1, B2 and B3. S1, S2 and S3 indicate slits 10 of the slit plate 9. The alignment of the laser beams B1, B2 and B3 is inclined at an angle $\theta$ with respect to the line Y—Y perpendicular to the main scanning direction A1. The laser beams B1, B2 and B3 shift their positions on the slit plate 9 as indicated by imaginary lines, to which times $t_0$ to $t_6$ are attached. At time $t_1$, as shown in FIG. 4B, only the laser diode which emits the laser beam B1 is kept ON, the other laser diodes which emit the laser beams B2 and B3 are kept OFF.

In this state, when the alignment of the light beams passes the position of time $t_1$, the light beam B1 passes through the slit S1 and comes to the photodetector 6. The photodetector 6 detects the light beam B1, and produces a first pulse PD1 (ON), as shown in FIG. 4B. Then the laser beam B1 is turned OFF when the laser beam B1 completely passes over the slit S1. As shown in FIG. 4A, the light beam B1 completely passes over the slit S1 at time $t_3$. At this time, the photodetector 6 does not receive any light at all. Therefore, the pulse PD1 falls (OFF). In response to the fall of the pulse PD1, the laser beam B1 is turned OFF. Alternatively, it is possible to turn OFF the laser beam B1 after the lapse of a predetermined time from the rise of the first pulse PD1.

Then, the laser beam B2 is turned ON after the lapse of a predetermined delay time C from the time $t_3$ when the first pulse PD1 falls. In this case, as shown in FIG. 4A, it is necessary to select the delay time C so that the laser beam B2 is turned ON during a time when the laser beam B2 is positioned between the slits S1 and S2. The delay time C is selected depending on an interval between the slits S1 and S2 and the scanning speed. When the laser beam B2 enters the slit S2, the photodetector produces a second pulse PD2. At the time $t_5$, the laser beam B2 is positioned at almost the center of the slit S2. Then the laser beam B2 is turned OFF when the second pulse PD2 falls.

Then the laser diode which emits the laser beam B3 is turned ON during a time when it is located between the slits S2 and S3. This may be done when a predetermined delay time passes after the laser beam B2 is turned OFF. When the laser beam B3 enters the slit S3, the photodetector 6 produces a third pulse PD3. When the laser beam B3 completely passes over the slit S3, the third pulse PD3 falls.

As described above, the slits S1 through S3 are provided for the respective laser beams B1–B3. Further, when one of the laser beams B1–B3 is located in the corresponding slit, the other laser diodes are kept OFF. Therefore, it is possible to separately detect the laser beams B1 through B3 with a high detection accuracy. It is specifically noted that it is possible to form each slit S1–S3 so as to have a width larger than the interval Da between the adjacent laser beams. Further, it is possible to separately detect laser beams without being affected by other laser beams.

Figure 5:
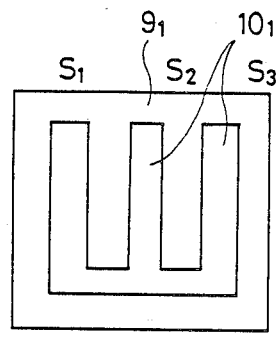
FIGS. 5, 6 and 7 are views of variations of slit plates used in the present invention.
Figure 6:
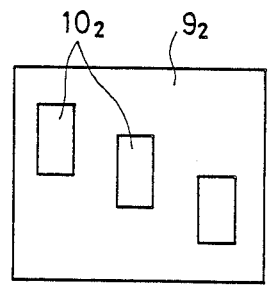
Figure 7:
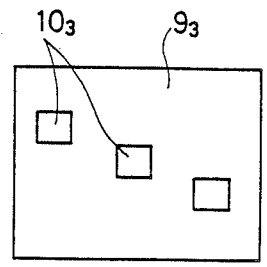

Variations of slits are illustrated in FIGS. 5 through 7. Referring to FIG. 5, an E-shaped slit $10_1$ is formed in a slit plate $9_1$. Portions S1 through S3 of the slit $10_1$ are arranged in parallel with each other. Referring to in FIG. 6, slits S1 through S3 are arranged in a slit plate $9_2$ so that the slit S1 is positioned under loci of the laser beams B1 and B2, but is not positioned on the locus of the laser beam B3. Referring to FIG. 7, slits S1 through S3 are arranged in a slit plate $9_3$ so that the slit S1 is positioned under the locus of the laser beam B1 and is not positioned under the loci of the laser beams B2 and B3. In cases when the slit plate $9_3$ of FIG. 7 is used, all the laser beams B1 through B3 may be kept ON during the entire operation. However, the slits S1 through S3 must be accurately positioned, and therefore may be actually impossible. If there is a positional error, the detection of each laser beam may be affected by flare of other beams. For the above-mentioned reason, it is desirable to control the laser beams in the aforementioned manner of the present invention.

In the above-mentioned embodiment, a time at which the laser beam B2 is turned ON, is determined based on the pulse PD1 derived from the photodetector related to the preceding laser beam B1. Similarly, a time at which the laser beam B3 is turned ON, is determined based on the pulse PD2 related to the preceding laser beam B3. Alternatively, it is possible to turn ON the laser beams B2 and B3 based on the pulse PD1, because the scanning speed and the slit interval are known. The important matter is that the laser beams are turned ON just before entering the corresponding slits, and are turned OFF when the corresponding detection signals are obtained.

Figure 8:
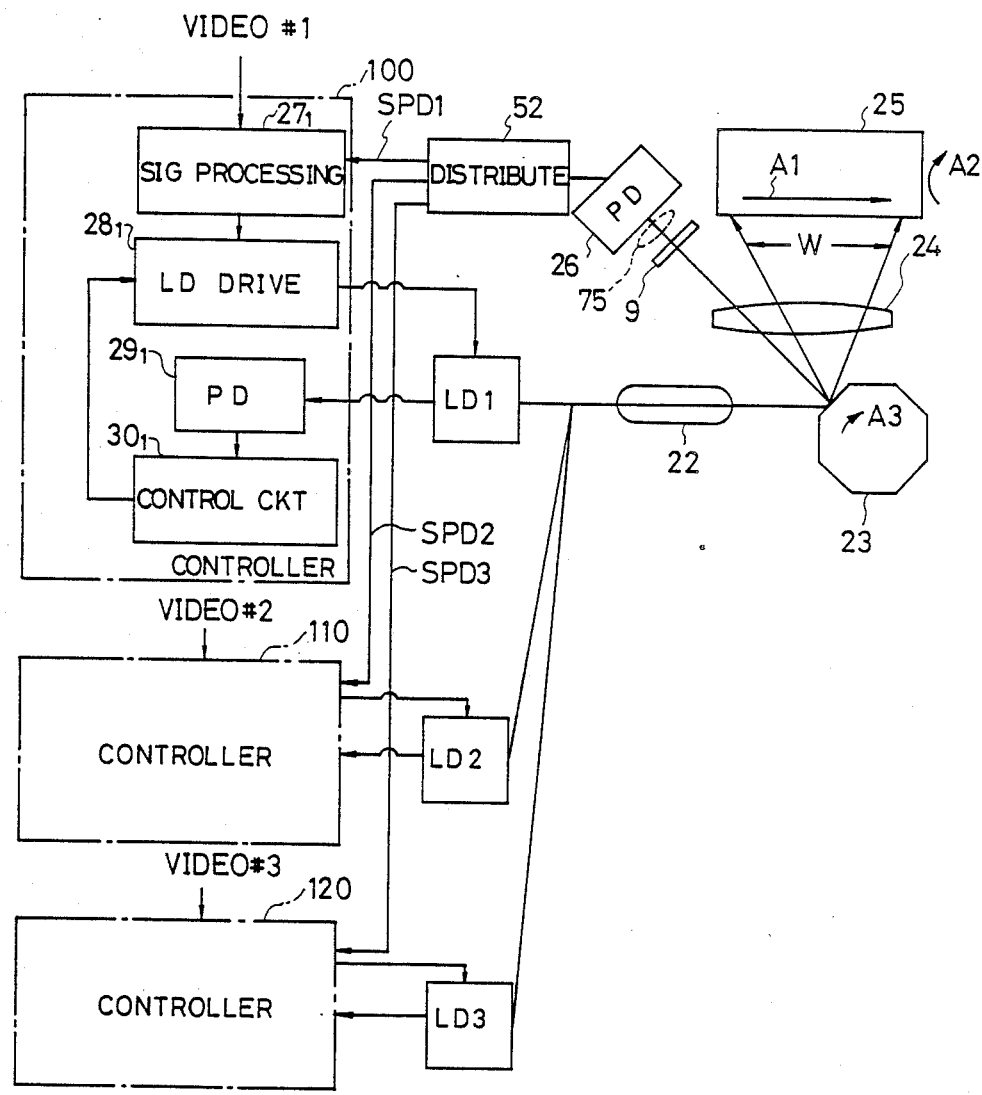
FIG. 8 is a block diagram of the entire light beam scanning apparatus in which the embodiment of the present invention is employed.
Figure 9:
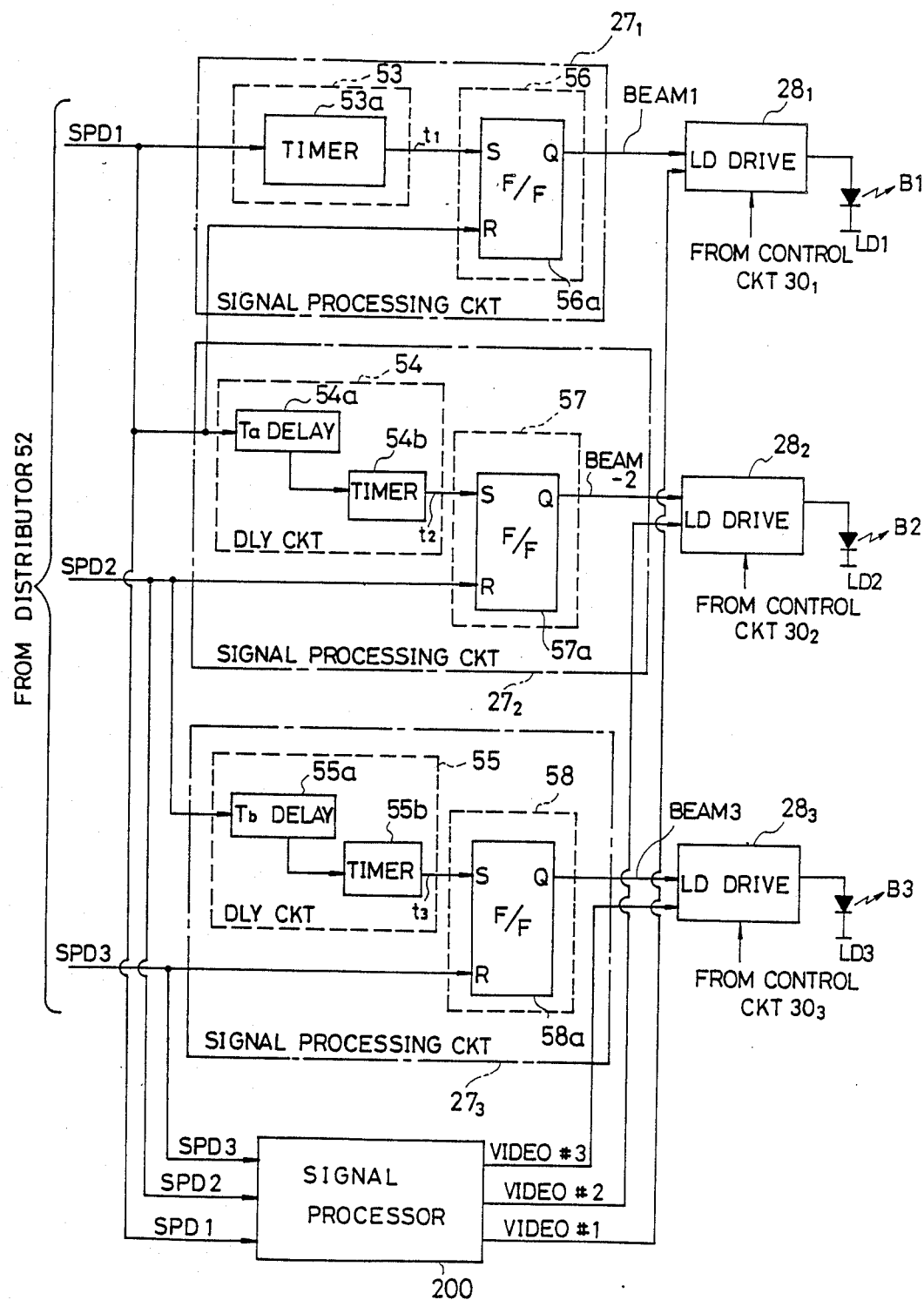
FIG. 9 is a circuit diagram of essential parts of FIG. 8 according to the embodiment of the present invention.

A description is given of a synchronization control circuit provided in a laser printer for controlling laser diodes on the basis of an output signal of a photodetector with reference to FIGS. 8 through 10.

A semiconductor laser unit 21 includes first, second and third laser diodes LD1, LD2 and LD3. Laser beams emitted from the laser diodes D1, LD2 and LD3 are arranged into a line so as to be inclined with respect to the sub scanning direction as shown in FIG. 4A. Forward laser beams B1, B2 and B3 emitted from the laser diodes LD1, LD2 and LD3, respectively, are changed to parallel laser beams through a collimator lens 22. Then the laser beams are deflected by a polygon mirror 23, which is driven in a direction of the arrow A3. The deflected laser beams pass through an f$\theta$ lens 24, which functions to focus each laser beam on an electrified circumferential surface of a photosensitive drum 25. Spots of the laser beams are moved repetitively on the circumferential surface of the photosensitive drum 25 in the direction of the arrow A1. During this operation, the photosensitive drum 25 rotates in the sub scanning direction of the arrow A2. A single photodetector 26 is located in the vicinity of the photosensitive drums 25 outside an information writing region W defined by the spread of the laser beams. The photodetector 26 separately detects the scanning beams deflected on the polygon mirror 23. The photodetector 26 includes the aforementioned slits S1–S3. The photodetector 26 generates detection signals SPD1, SPD2, and SPD3 for the respective laser beams, and supplies a light detection signal distributor (hereinafter simply referred to as distributor) 52 with those signals. The distributor 52 distributes the detection signals SPD1, SPD2, and SPD3 to controllers 100, 110 and 120, respectively.

The controller 100 includes a signal processing circuit $27_1$, a laser driving circuit $28_1$, a photodetector $29_1$, and a control circuit $30_1$. The other controllers 110 and 120 are the same as the controller 100. For the sake of simplicity, the detail of only the controller 100 is shown in FIG. 8. For the same reason, a signal processor 200 shown in FIG. 9 and wiring lines associated therewith are omitted in FIG. 8. The signal processing circuit $27_1$ generates a control signal BEAM1 from the corresponding detection signal SPD1. The control signal BEAM1 is used for temporarily turning ON the corresponding laser diode LD1 before the modulation is started. The signal processing circuit $27_1$ passes an information signal #1 (hereinafter referred to as a video signal #1) to be modulated on the laser beam B1 and supplies the laser driving circuit $28_1$ with the video signal #1.

The laser driving circuit $28_1$ drives the laser diode LD1 in response to the first video signal #1 or the control signal BEAM1. A backward laser beam emitted from the laser diode LD1 is received by the photodetector $29_1$. The back beam of the laser diode LD1 has a light intensity proportional to the front beam thereof.

An output of the photodetector $29_1$ is supplied to the control circuit $30_1$, which controls the laser driving circuit $28_1$ so that the amount of light of the forward laser beam is fixed.

Referring to FIG. 9, the signal processing circuit $27_1$ includes a timing controller 53 and a first control signal generator 56. A signal processing circuit $27_2$ included in a controller 110 is made up of a delay circuit 54 and a second control signal generator 57. A signal processing circuit $27_3$ includes a delay circuit 55 and a third control signal generator 58. The detection signal SPD1 supplied from the distributor 52 is supplied to the timing controller 53, the first control signal generator 56, and the delay circuit 54. The detection signal SPD2 is supplied to the second control signal generator 57 and the delay circuit 55. The detection signal SPD3 is supplied to the third control signal generator 58. The first, second and third control signal generators 56, 57 and 58 generate control signals BEAM1, BEAM2 and BEAM3, which are supplied to laser driving circuit $28_1$, $28_2$ and $28_3$, respectively. Video signals #1, #2 and #3 are supplied to the laser driving circuits $28_1$, $28_2$ and $28_3$, respectively. The laser driving circuits $28_1$, $28_2$ and $28_3$ drive the laser diodes LD1, LD2 and LD3, respectively. The laser driving circuits $28_1$, $28_2$ and $28_3$ modulate laser beams in response to the video signals #1, #2 and #3, respectively.

The detection signals SPD1, SPD2 and SPD3 are also supplied to a signal processor 200, which produces the video signals #1, #2 and #3. The signal processor 200 determines modulation starting timings for the video signals #1, #2 and #3 on the basis of the detection signals SPD1, SPD2 and SPD3, respectively.

The timing controller 53 includes a timer 53a. The delay circuit 54 includes a delay element 54a and a timer 54b. The delay circuit 55 includes a delay element 55a and a timer 55b. The control signal generators 56, 57 and 58 include RS flip-flops 56a, 57a and 58a, respectively. Hereinafter, an RS flip-flop is simply referred to as an F/F. A timing signal $t_1$ derived from the timer 53a is supplied to a set terminal (S) of the F/F 56a. The detection signal SPD1 is supplied to a reset terminal (R) of the F/F 56a. Set and reset terminals of the F/F 57a are supplied with a timing signal $t_2$ and the detection signal SPD2, respectively. Set and reset terminals of the F/F 58a are supplied with a timing signal $t_3$ and the detection signal SPD3, respectively.

A description is given of an operation of the embodiment with reference to FIG. 10. After power ON, as shown in FIG. 10(c), the F/F 56a supplies the laser driving circuit $28_1$ with the control signal BEAM1. Thereby, the laser diode LD1 is turned ON, and emits the laser beam B1. When the photodetector 26 detects the laser beam B1, the corresponding detection signal SPD1 is supplied from the distributor 52 to the timer 53a and the F/F 56a. Thereby, the F/F 56 is reset as shown in FIG. 10(c), and the laser diode LD1 is turned OFF as shown in FIG. 10(a). As shown in FIG. 10(b), the timer 53a is triggered by the detection signal SPD1, and starts counting. Then when the timer 53a counts a fixed time T1, it outputs the timing signal $t_1$, as shown in FIG. 10(b). By the timing signal $t_1$, the F/F 56a is set to rise the control signal BEAM1, and the LD1 is turned ON by the laser driving circuit $28_1$ (FIG. 10(c)). Then the photodetector 26 waits for the incoming of the laser beam B1 passing through the slit S1 shown in FIG. 4A. Then, when the photodetector 26 detects the laser beam B1 through the slit S1 (FIG. 10(a)), the distributor 52 resets the F/F 56a. Thereby, the control signal BEAM 1 is turned OFF (FIG. 10(c)). The above-mentioned operation is cyclically performed.

In order to detect the laser beam B2 emitted from the laser diode LD2 by the photodetector 26 and obtain the detection signal SPD2, as shown in FIG. 10(d), the detection signal SPD1 is delayed by a predetermined delay time Ta by the delay element 54a in the delay circuit 54. It is now assumed that the delay time Ta is greater than the pulse width of the detection signal SPD1 in order to separately detect the laser beams B1 and B2. A delayed signal derived from the delay element 54a is supplied to the timer 54b as a trigger signal. Thereby the timer 54b starts counting a fixed time T2 (FIG. 10(e)). When the timer 54b counts the fixed time T2, the F/F 57a is set by the timing signal $t_2$ supplied from the timer 54b, and outputs the control signal BEAM2 (FIG. 10(f)). Thereby, the laser diode LD2 is turned ON by the laser driving circuit $28_2$. Then the photodetector 26 waits for the incoming of the laser beam B2 through the corresponding slit S2. When the photodetector 26 detects the laser beam B2 passing through the slit S2, the corresponding detection signal SPD2 is outputted from the distributor 52 (FIG. 10(g)), and is supplied to the reset terminal of the F/F 57a. Therefore, the control signal BEAM2 is turned OFF (FIG. 10(f)), and thereby the LD2 is turned OFF.

In order to detect the laser beam B3 emitted from the laser diode LD3 and obtain the corresponding detection signal SPD3, the detection signal SPD2 is delayed by a fixed time Tb by the delay element 55a. It is now assumed that as shown in FIG. 10(g), the delay time Tb is made greater than the pulse width of the detection signal SPD2 in order to separately detect the laser beams B2 and B3. A delay signal derived from the delay element 55a is supplied to the timer 55b as a trigger signal. When the timer 55b counts a fixed time T3 (FIG. 10(i)), the timer 55b outputs the timing signal $t_3$ to the set terminal of the F/F 58a (FIG. 10(i)). Thereby, the control signal BEAM3 is turned ON (FIG. 10(j)), and the laser diode LD3 is turned ON by the laser driving circuit $28_3$. Then the photodetector 26 waits for the incoming of the laser beam B3 passing through the slit S3. Then when the photodetector 26 detects the laser beam B3 (FIG. 10(k)), the F/F 58a is reset by the detection signal SPD3 (FIG. 10(j)), and the laser diode LD3 is turned OFF.

It is noted that the present invention is not limited to the structure shown in FIGS. 8 and 9, and variations and modifications may be made. In addition, the fixed times T1, T2 and T3 may be identical to or different from each other. Similarly, the delay times Ta and Tb may be identical to or different from each other.

The delay times Ta and Tb are determined as follows. As described previously by referring to FIGS. 4A and 4B, the laser beams B1-B3 are arranged into a line, and are moved in the main scanning direction at an equal speed. It is now assumed that that the scanning speed is represented as v. A respective period with which the laser beam B1 passes on the slit S1, depends mainly on an accuracy in rotation of the polygon mirror 23, and can be therefore estimated. Therefore, it is possible to turn ON the control signal BEAM1 after a predetermined time from the occurrence of the preceding detection signal SPD1. Then the laser beam B1 enters the slit S1 and, at the same time, is detected by the photodetector 26. Thereby the control signal BEAM1 is turned OFF, and the laser diode LD1 is turned OFF. Normally, a time interval between the time when the laser beam B1 start of passing the slit S1 and the the time of turning OFF the laser beam B1, may be set smaller than Dd/v.

The laser beam B2 starts to pass the corresponding slit S2 when a time (Da+Dd)/v lapses after the laser beam B1 starts to pass the slit S1. It is necessary for the laser beam B2 to be turned ON before passing the slit S2. At this time, if the laser beam B2 is still kept OFF, a correct modulation starting time is not obtained. As a result, the delay time Ta is set longer than the above-mentioned time interval, and is set shorter than the above-mentioned time (Da+Dd)/v. Similarly, the delay time Tb can be determined.

The detection signals SPD1, SPD2 and SPD3 are supplied to the signal processor 200, which produces the video signals #1, #2 and #3. The modulation starting times for the video signal #1, #2 and #3 are determined in accordance with the detection signals SPD1, SPD2 and SPD3, respectively.

It is possible to supply the delay element 54a with the detection signal SPD1 as a trigger signal. In this case, the delay time Ta is increased coupled to the case where the delay element is triggered by the detection signal PSD2.

Figure 11A:
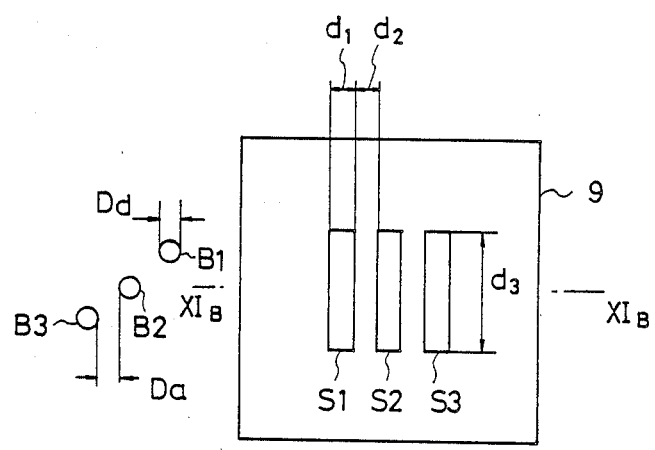
FIG. 11A, 11B and 11C are views for illustrating the detail of examples of the slit plates used in the present invention.
Figure 11B:
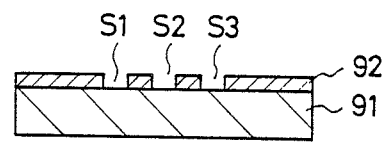
Figure 11C:
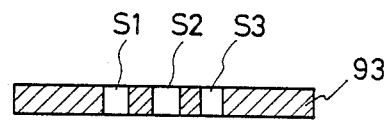

A description is given of the detail of the structure of the slit plate 9 with reference to FIGS. 11A, 11B and 11C.

FIG. 11A is a plan view of the slit plate 9, and FIG. 11B is a cross sectional view taken along a line $XI_B$—$XI_B$. The slit plate 9 is made up of a glass plate 91 and a patterned aluminum vapor deposition layer 92. An aluminum film is deposited on the glass plate 91, and is then patterned so as to obtain the slits S1 to S3 by photoetching. Each of the slits S1 to S3 has a width $d_1$ of approximately 0.2 mm, and a length $d_3$ of approximately 2 mm. A distance $d_2$ between opposite ends of the adjacent slits is approximately 0.2 mm. The above dimensions is suitable for a case where each of the laser beams B1-B3 has a diameter of approximately 100 µm. In principle, the laser beams B1-B3 are equal to or larger than 100 µm in diameter. Of course, the slits S1-S3 may exceed 0.2 mm in width $d_1$. This is one of the essential features of the present invention. It is noted that when a wider slit and an increased number of laser beams are used, it is necessary to increase the length thereof in the sub scanning direction. This may cause fluctuations in sensitivity of the photodetector 26, and decrease the accuracy in the light detection. In addition, there are fluctuations in sensitivity in different photodetectors, and the sensitivity is affected by light detecting positions, a scattering state of light and a degree thereof. Those problems can be eliminated by interposing a condenser lens 75 between the photodetector 26 and the slit plate 9, as shown in FIG. 8. It is particularly noted that the width Ds of each slit S1-S3 can be made large irrespective of the interval Da between adjacent laser beams in the main scanning direction A1. In extreme cases, it is possible to arrange the light beam array in the direction perpendicular to the main scanning direction A1.

FIG. 11C is a cross sectional view of another slit plate. The illustrated slit plate is a stainless plate 93 having the slits S1-S3. It is easy to form slits each having a width of approximately 0.2-0.5 mm in the stainless plate having a thickness of approximately 0.1 mm.

The present invention is not limited to the above-mentioned slit plates, and variations thereof may be made with ease. For example, the patterned aluminum film 92 may be replaced with other opaque metallic materials. The glass plate 91 may be substituted with other transparent materials. Further, the stainless plate 93 may be substituted with other opaque metallic plates.

The present invention is not limited to the aforementioned embodiments, and variations and modifications may be made without departing from the scope of the present invention.

What is claimed is:

1. A multi-beam detecting apparatus adapted to an optical system in which a recording medium is scanned by a plurality of light beams emitted from respective light sources, comprising;
   light detecting means for producing detection signals when the corresponding light beams come to a predetermined position;
   light interrupting means interposed between said light sources and said light detecting means and having transparent portions related to said respective light beams; and
   controlling means for controlling ON/OFF states of said light sources in accordance with said respective detection signals related to the corresponding light beams passing through said respective transparent portions.

2. A multi-beam detecting apparatus as claimed in claim 1, wherein said controlling means comprises means for turning ON said laser sources just before the corresponding light beams enter said respective transparent portions and for turning OFF said light sources when the corresponding detection signals are produced by said light detecting means.

3. A multi-beam detecting apparatus as claimed in claim 1, wherein said transparent portions comprise rectangular slits.

4. A multi-beam detecting apparatus as claimed in claim 3, wherein said rectangular slits are arranged in the direction of scanning by said light beams.

5. A multi-beam detecting apparatus as claimed in claim 3, wherein each of said rectangular slits has a width equal to or greater than a diameter of each of said light beams.

6. A multi-beam detecting apparatus as claimed in claim 1, wherein said light interrupting means comprises a transparent plate, and a patterned metal formed on said transparent plate, and wherein portions of said transparent plate on which said patterned metal is not formed, correspond to said transparent portions.

7. A multi-beam detecting apparatus as claimed in claim 1, wherein said light interrupting means comprises an opaque metallic plate having slits penetrating said opaque metallic plate.

8. A multi-beam detecting apparatus as claimed in claim 1, wherein said light detecting means comprises a single photodetector.

9. A multi-beam detecting apparatus as claimed in claim 2, wherein said controlling means comprises a timing controller for producing a timing signal when a predetermined time passes after one of said detection signals is applied thereto, and a control signal generator comprising an RS flip-flop having a set input provided with said timing signal supplied from said timer, and a reset input supplied with said one of the detection signals, and wherein an output of said flip-flop controls the ON/OFF control of the corresponding one of said laser sources.

10. A multi-beam detecting apparatus as claimed in claim 2, wherein said controlling means comprises a delay element for delaying one of said detection signals by a predetermined delay time; a timer, triggered by a delayed output of said delay element, for producing a timing signal when a predetermined time passes after said delayed output is applied thereto; and a control signal generator comprising an RS flip-flop having a set input provided with said timing signal supplied from said timer, and a reset input supplied with one of said detection signals which precede said one of the detection signals supplied to said delay element, and wherein an output of said flip-flop controls the ON/OFF control of the corresponding one of said laser sources.

11. A multi-beam detecting apparatus as claimed in claim 1, further comprising a condensor lens interposed between said light detecting means and said light interrupting means.

* * * * *